Figure 1:
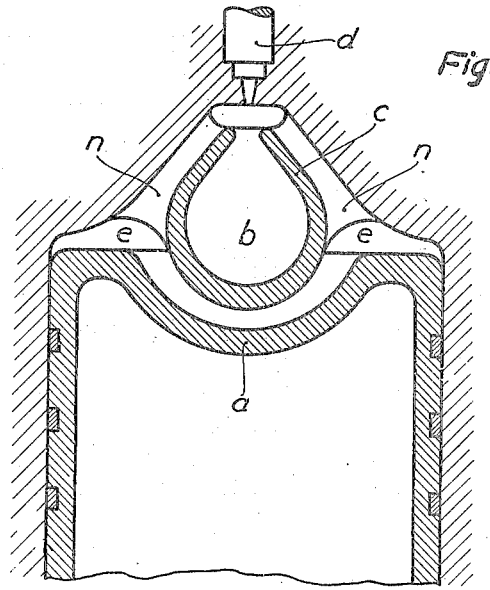

Patented Aug. 7, 1928.

1,679,832

UNITED STATES PATENT OFFICE.

FRANZ LANG, OF STUTTGART, GERMANY, ASSIGNOR TO ACRO AKTIENGESELLSCHAFT, OF KUSSNACHT-ON-THE-RIGI, SWITZERLAND.

COMBUSTION-POWER ENGINE.

Application filed November 21, 1925, Serial No. 70,616, and in Germany December 6, 1924.

The present invention relates to an oil motor having an additional combustion space, which is connected to the usual combustion space by means of a throttling restriction, through which air and fuel together flow into the additional combustion space. In the previous motors of the kind described the additional combustion space is arranged either as a hollow space within the piston or is disposed at the circumference of the cylinder.

In the last named construction the walls of the additional combustion space are heated only at their inner sides because their outer sides do not come in contact with hot gases, but, moreover, are cooled in various manners. This feature, however, results in tension of heat in said walls and besides, when the motor runs without load or with only a slight load, the wall parts encircling the additional combustion space are cooled too much, the running of the motor is disturbed and the combustion is rendered difficult.

These drawbacks are nearly completely obviated by the provision of the additional combustion space within the piston. However, this construction requires heavy pistons and accordingly is not well adapted for rapidly running engines.

According to the invention the deficiencies of the known construction hitherto employed are eliminated by suitably arranging within the interior of the cylinder a receptacle which furnishes an additional or preliminary combustion space. This receptacle or combustion-chamber which is so mounted in the cylinder as to be suspended therein, is swept on its entire surface by the hot gases so that all parts of the same are uniformly heated. It has already been proposed to arrange a receptacle forming the additional combustion-space within the interior of the cylinder, however, in those cases the combustion-space or chamber was provided with a number of orifices or openings at various points of the chamber, whereby a complete intermingling of the fuel and air and a proper and thorough combustion was rendered impossible and a considerable loss of energy was rendered unavoidable.

The present invention removes such objections by providing a combustion-chamber within the cylinder spaced from the walls thereof and provided with an opening for receiving the fuel from a fuel-injector but closed at all other points during the end of the compression-stroke and the beginning portion of the expansion stroke of the piston, the said opening being preferably adjacent to and in line with the fuel-injector in the cylinder head. Thereby the air compressed by the piston is caused to be projected and guided into the combustion-chamber by the fuel-jet and thoroughly intermixed therewith as it enters the chamber, thus leading to a complete combustion prior to the exit of the gases from the chamber into the surrounding cylinder space. This result is enhanced by certain specific features of the preferred embodiment of my invention, such as forming the chamber pear-shaped, the fuel and air admitting opening being at the narrow constricted part of the chamber and facing the fuel-injector, and spacing bars for supporting the suspended chamber and providing passage-ways or channels for the flow of the compressed air to the chamber opening and other features to be below pointed out.

In the accompanying drawing two forms of construction of my improved combustion power engine are illustrated in a diagrammatical manner, that parts of the engine, which are not necessary for the understanding of the invention, being omitted.

In said drawing

Figure 2:
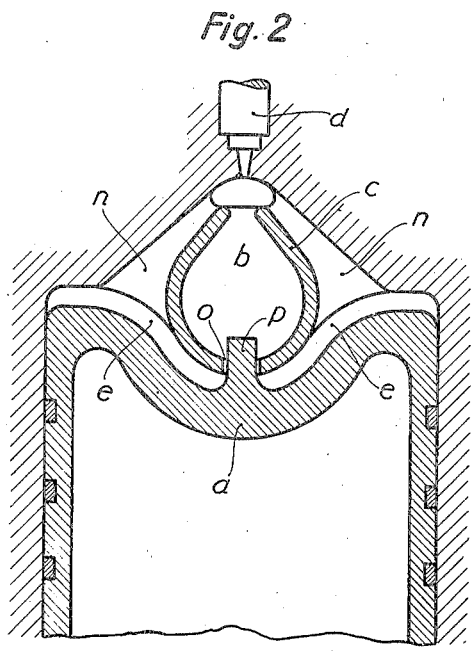

Fig. 1 is a vertical section through the cylinder and the piston of a two cycle engine and Fig. 2 also is a vertical section through the cylinder and the piston of a modified form of a two cycle engine.

In both forms of construction the piston is indicated by the reference character $a$. On the cylinder bottom a pear-shaped receptacle $c$ is suspended and secured by means of preferably longitudinal ribs or bars $n$, so as to be spaced from the walls of the cylinder. The hollow space $b$ of the receptacle forms the combustion chamber. The fuel is injected through a fuel injector or nozzle $d$ arranged in the head of the cylinder, the axis of said nozzle preferably coincides with the axis of the combustion chamber. The mouth of the receptacle, adjacent to the injection nozzle, is reduced in such a manner, that it acts like a nozzle.

The operation of this first form of construction of my improved combustion engine is as follows:

The air present in the cylinder space $e$ is compressed during the compression stroke and is heated thereby. The thus produced air current flows through the space between the bars $n$ and through the reduced mouth of the combustion chamber into the latter. During the last part of the compression stroke the fuel is injected through the nozzle $d$. The air flowing into the chamber $b$ in the direction of the fuel-jet is mixed with the injected fuel and the thus produced mixture enters through the reduced opening into the combustion chamber. Immediately after the fuel and air have passed said reduced mouth, the mixture has become thus intimate on account of the nozzle action, that self ignition takes place within the combustion chamber. The ignition bursting out from the chamber is then transmitted within the cylinder space $e$ towards all those points, where a combustible mixture has been formed.

In the just described form of construction the mixture ignited in the hollow space $b$ can withdraw only through the reduced opening of the combustion chamber, however this action will result in throttling losses. In order to avoid this drawback the second modification shown in Fig. 2 is constructed in such a manner, that such throttling losses are materially reduced in a very simple manner. In this form of construction an additional communication between combustion chamber and cylinder space is established, said communication being controlled by the piston. This additional communication, however, must be cut off at the latest at the moment, when, toward the end of the compression stroke, the injection starts, as otherwise the compressed air does not flow through the reduced opening, but through the additional communication into the combustion chamber.

In the modification illustrated in Fig. 2 the additional communication-channel is formed by an aperture $o$ in the bottom of the receptacle $c$, as soon as the pin $p$ on the bottom of the piston emerges from said aperture.

The suspension of the receptacle $c$ on the bottom of the cylinder by the preferably longitudinal ribs or bars 22, as shown in both forms of construction, is especially advantageous, as the heat is withdrawn only difficultly from the cooled cylinder parts, so that the walls of the combustion space remain always nearly ununiformly warm, even at alternating operation. These ribs or bars also serve to form passage-ways or channels to promote the flow of compressed air to the air-and-fuel-receiving orifice or mouth in the combustion-chamber $b$.

It is obvious that the combustion chamber itself as well as the manner of securing the same to the bottom of the cylinder or even to the latter can be constructed or effected in various other ways, without departing from the basic idea of the invention.

I claim:

1. In a combustion-engine, a cylinder provided at its head with a fuel-injector and a combustion-chamber suspended within said cylinder, spaced from the walls thereof and provided with an opening for admitting compressed air from the cylinder and fuel from the fuel-injector, said combustion-chamber being closed at all other points at the end of the compression stroke and the beginning of the expansion stroke of the piston.

2. In a combustion-engine, a cylinder provided at its head with a fuel-injector and a combustion-chamber suspended within said cylinder, spaced from the walls thereof and provided with an opening for admitting compressed gases from the cylinder and fuel from the fuel-injector.

3. In a combustion-engine, a cylinder provided at its head with a fuel-injector and a combustion-chamber suspended within the same, spaced from the walls thereof and provided with a single opening adjacent to and substantially in axial line with the fuel-injector.

4. In a combustion engine, a cylinder provided at its head with a combustion-chamber suspended within said cylinder, spaced from the walls thereof, and provided with an opening, in combination with a fuel-injector in the cylinder adjacent to the said opening and arranged to inject fuel into said opening and with means to keep the combustion-chamber closed at all other points at the beginning of the expansion-stroke and the end of the compression-stroke of the piston.

5. In a combustion-engine, a cylinder provided at its head with a combustion-chamber suspended within said cylinder, spaced from the walls thereof and provided with an opening opposite the cylinder end, in combination with a fuel-injector in said cylinder adjacent to and opposite said opening and axially substantially in line with said opening, and with means to keep the combustion-chamber closed at all other points during the initial portion of the expansion-stroke and the end of the compression stroke of the cylinder-piston.

6. In a combustion-engine, a cylinder provided with a fuel-injector at its head and a piston reciprocating within the same, in combination with a combustion-chamber arranged within the cylinder-head, spaced from the walls thereof and formed with an opening at its forward portion and a second opening at another portion of its walls, in combination with means for closing said second opening during the initial portion of the expansion stroke of the piston and the end of the compression stroke of same.

7. In a combustion-engine, a cylinder provided with a fuel-injector at its head and a piston reciprocating therein, in combination with a combustion-chamber arranged within the cylinder-head, spaced from the walls thereof and formed with an opening adjacent to and in line with the fuel-injector, and a second opening at another portion of its walls, the piston being provided with means for closing said second opening as it approaches said chamber.

8. In a combustion-engine, a cylinder provided with a fuel-injector at its head and a piston reciprocating in the cylinder, in combination with a combustion-chamber arranged within and spaced from the walls of the cylinder-head, and formed with a fuel-receiving opening adjacent to the fuel-injector, and a second opening, the piston being provided with a projection for entering and closing said second opening at the end of the compression-stroke and beginning of the expansion-stroke.

9. In a combustion-engine, a cylinder provided with a fuel-injector and a piston reciprocating within said cylinder, in combination with a combustion-chamber arranged within and spaced from the walls of the cylinder, said chamber being of pear-like shape with an opening at its narrow portion and adjacent to and facing the fuel-injector.

10. In a combustion-engine, a cylinder provided with a fuel-injector and a piston reciprocating in said cylinder, in combination with a combustion-chamber enclosed in and spaced from the walls of said cylinder, said combustion-chamber being provided with an opening for receiving the fuel from the fuel-injector, and spacing-bars between the cylinder-walls and the combustion-chamber arranged to support the same and to form passage-ways for the flow of compressed air to the opening of the combustion-chamber.

11. In a combustion-engine, a cylinder provided with a fuel-injector and a piston reciprocating in said cylinder, in combination with a combustion-chamber enclosed in and spaced from the walls of the cylinder, said combustion-chamber being provided with a mouth or opening arranged to receive the fuel from the injector and being reduced or restricted in such a manner as to act like a nozzle.

In testimony whereof I have hereunto affixed my signature.

FRANZ LANG.